United States Patent [19]

Barbosa

[11] Patent Number: 5,137,120

[45] Date of Patent: Aug. 11, 1992

[54] BLIND CABLE LEVER ARM STAMPING

[75] Inventor: Manuel Barbosa, Novi, Mich.

[73] Assignee: Orschorn Co., Moberly, Mo.

[21] Appl. No.: 713,146

[22] Filed: Jun. 11, 1991

[51] Int. Cl.$^5$ .............................................. B60T 1/00
[52] U.S. Cl. ..................................... 188/2 D; 188/78;
188/106 F; 188/106 A; 188/325; 74/502.6
[58] Field of Search ............. 188/2 D, 106 A, 106 F,
188/106 R, 106 P, 325, 328, 331; 74/502.4,
502.6

[56] References Cited

U.S. PATENT DOCUMENTS

| | | | |
|---|---|---|---|
| 4,753,325 | 6/1988 | Jaksic | 188/2 D |
| 4,872,533 | 10/1989 | Boyer et al. | 188/2 D |
| 4,886,134 | 12/1989 | Yamamoto | 188/2 D |
| 4,955,458 | 9/1990 | Shellhause | 188/2 D |
| 5,002,159 | 3/1991 | Brix | 188/2 D |
| 5,058,713 | 10/1991 | Evans | 188/328 |

Primary Examiner—Robert J. Oberleitner
Assistant Examiner—Chris Schwartz
Attorney, Agent, or Firm—Lawrence E. Laubscher, Sr.

[57] ABSTRACT

A flat lever (314) for use in a blind-cable-connection parking brake system is formed by stamping from sheet steel stock. At one end, the lever is adapted for pivotal connection with a backing plate, and at its other end, the lever is stamped to defined opposed spaced inclined ramp (314a) and helical guide spring support (314b) portions integral with the lever. In order to properly orient the guide spring relative to the ramp, the guide spring support includes a support ledge (314d) for supporting one end of the spring (320) relative to a spring-receiving opening formed in the guide spring support portion.

6 Claims, 1 Drawing Sheet

BLIND CABLE LEVER ARM STAMPING

STATEMENT OF THE INVENTION

A parking brake lever assembly of the blind cable connector type is disclosed, characterized in that the lever is stamped from cold-rolled or hot-rolled steel sheet stock to define integral inclined ramp means, and integral spring support means opposite, spaced from, and having a given alignment relative to said ramp means.

BRIEF DESCRIPTION OF THE PRIOR ART

Blind cable arrangements for automatically connecting a resilient control cable with a parking brake lever are well known in the prior art, as evidenced, for example, by the to Boyer U.S. Pat. No. 4,872,533 (which is assigned to the same assignee as the present invention), Jaksic U.S. Pat. No. 4,753,325, Shellhause U.S. Pat. No. 4,955,458, and Brix U.S. Pat. No. 5,002,159. In these systems, a brake control cable is automatically connected with the lever in a blind fashion by feeding the cable through a guide spring until the enlarged cable extremity rides up a ramp for connection with a cable mounting opening associated therewith.

Continuing efforts have been made to reduce the manufacturing cost and structural complexity of the parking brake lever. In the prior Boyer et al construction, for example, the lever includes a pair of rolled semi-circular tabs that cooperate to define generally tubular means by which one end of the helical guide spring is connected with the lever. The cost of manufacturing such a lever construction is significant owing to the complexity and number of manufacturing steps required.

Another problem inherent to certain blind cable systems is the difficulty in maintaining proper alignment of the helical guide spring with the ramp surface, so that the cable will always be automatically guided by the ramp toward the cable mounting opening.

SUMMARY OF THE INVENTION

The present invention was developed to provide a positive-acting parking brake lever of simple design that is relatively inexpensively produced from hot or cold rolled steel stock solely by one or more stamping operations.

According to a primary object of the invention, the parking brake lever is pivotally connected at one end with the backing plate, the other end of the lever being provided with integral ramp means, and integral spring support means opposite, spaced from and in a predetermined alignment with the ramp means, said lever being produced solely by means of stamping operations.

According to a more specific object of the invention, the ramp means and the spring support means are planar portions bent from the lever along generally parallel fold lines. The ramp portion is bifurcated so that the gap defined by the bifurcation constitutes the cable receiving opening. Similarly, the spring support means is bifurcated to define the opening for receiving one end of the helical guide spring. According to a characterizing feature of the invention, a support ledge is provided for supporting the spring end with a given orientation relative to the ramp, thereby to insure positive connection between the cable enlarged terminal portion and the cable mounting opening.

DESCRIPTION OF THE DRAWING

Other objects and advantages of the invention will become apparent from a study of the following specification, when viewed in the light of the accompanying drawings, in which.

DETAILED DESCRIPTION

Figure 1:
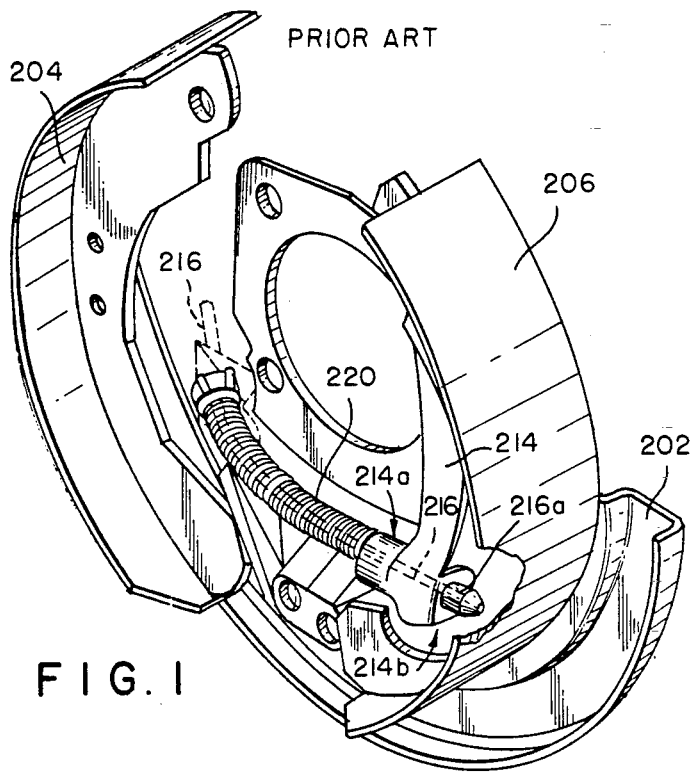
FIG. 1 is a perspective view of a blind cable assembly of the prior art (specifically, the Boyer U.S. Pat. No. 4,872,533)
Figure 2:
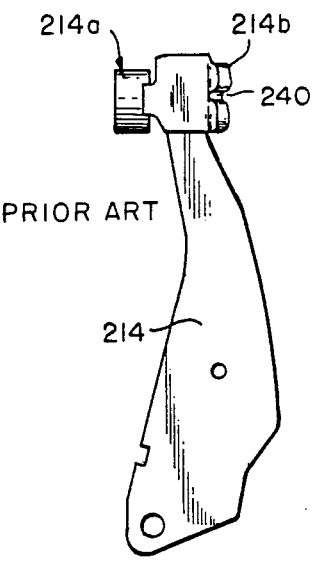
FIGS. 2 and 3 are top plan and detailed perspective views, respectively, of the prior art lever of 1.
Figure 3:
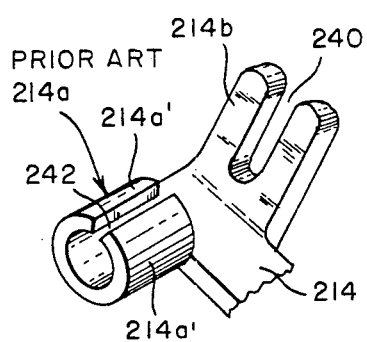
Figure 4:
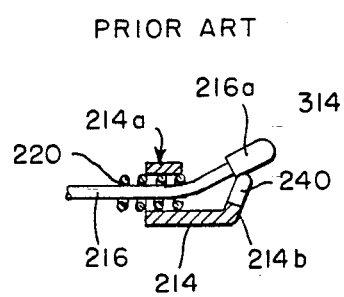
FIG. 4 a detailed sectional view illustrating the operation of the blind cable connection of the prior art apparatus of FIGS. 1-3.

Referring first more particularly to the prior art embodiment of FIGS. 1-4, as exemplified by the Boyer U.S. Pat. No. 4,872,533, the control cable 216 is guided through a helical guide spring 220 for engagement with the ramp portion 214b of the parking brake lever arm 214. At one end, the guide spring 220 is mounted in an opening contained within the backing plate 202, and its other end, the guide spring is supported by guide spring support means 214a on the parking brake lever 214. As best shown in FIG. 3, the guide cable support means 214a has a generally tubular longitudinally-split configuration including a pair of semicircular tab portions 214a' that are separated by a gap 242. Thus, as shown in FIG. 4, when the associated end of the helical guide spring is inserted within the spring support means, the tab portions 214a' are clinched together, thereby to connect the end of the guide spring with the lever, whereby the spring biases the lever in the brake off direction. In order to connect the control cable 216 with the lever, the enlarged end portion 216a of the control cable is progressively inserted within the helical guide spring 220, whereupon the end of the enlarged end portion 216a rides up the ramp surface 214b until the enlarged portion clears the upper end of the ramp, whereupon the cable 216 will drop down the slot 240 until the enlarged end portion 216a is retained behind the ramp portion 214b.

Figure 5:
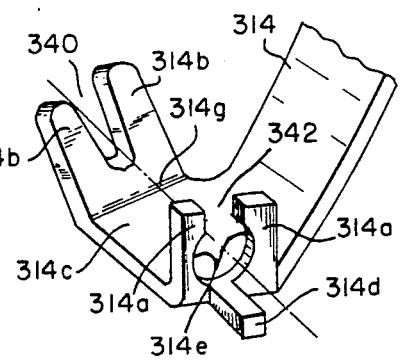
FIG. 5 is a detailed perspective view of the improved lever construction of the present invention.

Referring now to FIG. 5, in accordance with the present invention, the parking brake lever arm 314 is manufactured solely by stamping operations, thereby to reduce the manufacturing cost of the lever without deleteriously effecting the blind cable connecting operation.

Figure 6:
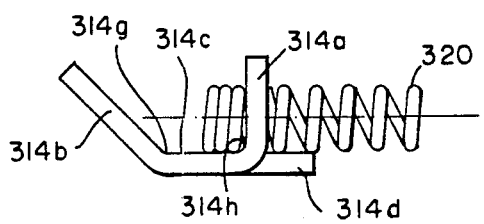
FIG. 6 is a side view illustrating the manner of support of the helical guide spring by the ledge of FIG. 5 in aligned relation to the ramp surface.

In the present invention, the ramp portion 314b is bent upwardly about fold line 314g, and the spring support portion 314a is bent upwardly about the fold line 314h, which fold line is generally parallel with the first fold line 314g. As shown in FIG. 6, the ramp portion 314b is inclined at an obtuse angle to the intermediate end portion 314c of the lever 314, and the spring support portion 314a is generally normal to the lever intermediate portion 314c.

The ramp portion 314b is bifurcated by the slot 340 which defines the cable mounting opening in the ramp, and the spring support portion 314a is bifurcated to define a pair of first tab portions 314a that is separated by the gap 342.

Figure 7:
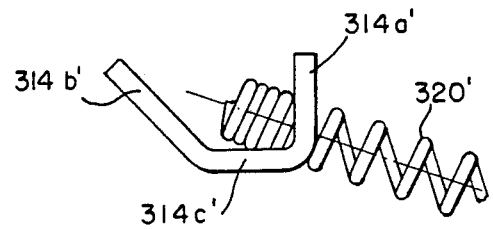
FIG. 7 is side view illustrating the possible misalignment that would occur in the absence of the support ledge portion of FIGS. 5 and 6.

According to a characterizing feature of the invention, the lever is provided with a ledge portion 314d that is coplanar with the lever intermediate portion 314c and extends outwardly normal to the spring support portion 314a, which ledge portion extends immediately adjacent the opening 342, thereby to support the associated end of the helical guide spring 320 relative to the inclined ramp portion 314b, as shown in FIG. 6. Thus, the ledge portion 314 assures that the associated end of the helical guide spring 320 is aligned relative to the ramp portion 314b, whereupon the first tab portions 314a are clinched together to connect the spring 320 with the lever 314. FIG. 7 illustrates the deleterious condition that would occur upon the omission of a ledge corresponding to the ledge 314d of FIG. 6. Thus, the longitudinal axis of the guide spring 320' is angularly arranged at an undesired angle to the ramp surface 314b', whereupon positive action of the connection between the cable and cable mounting opening 340 cannot be achieved.

Preferably, the adjacent edges of the first tab portions 314a of the spring support means contain semi-circular openings 314e that cooperate to define a circular opening that corresponds generally with the outer diameter of the helical guide spring 320. After the associated end of the guide spring is introduced within the opening, the tab portions 314a are clinched together, thereby to permanently connect the guide spring end with the parking brake lever.

It is apparent that various modifications might be made in the configuration of the spring support means, such as stamping the ledge from the spring support tab means without completely bifurcating the same.

While the preferred forms and embodiments of the invention have been illustrated and described, it will be apparent that various modifications may be made without deviating from the inventive concepts set forth above.

What is claimed is:

1. A blind-connection parking brake assembly for operating brake shoe means relative to a vehicle wheel braking surface, comprising:
   (a) a backing plate;
   (b) a helical guide spring one end of which is mounted in a first opening contained in said backing plate;
   (c) a flat parking brake lever pivotally connected at one end with said backing plate, said lever being stamped from rolled metal shock and including adjacent its other end:
      (1) inclined generally planar ramp means (314b) adjacent one side edge of said lever, said ramp means containing a cable-mounting opening (340);
      (2) guide spring support means adjacent the other side edge of said lever opposite and spaced from said ramp means; and
      (3) a generally planar intermediate portion (314c) arranged between said ramp means and said guide spring support means, said ramp means comprising an integral ramp portion bent from said lever about a first fold line (314g) to define an obtuse angle relative to said intermediate portion;
      (4) said guide sprig support means including:
         (a) generally planar first tab means (314a) bent about a second fold line (314h) generally parallel with said first fold line to a position generally normal to said intermediate portion and extending on the same side thereof as said ramp portion, said first tab means containing a second opening (342) for receiving the other end of said guide spring; and
         (b) a ledge portion (314d) generally coplanar with, and arranged on the opposite side of said first tab means from, said intermediate portion, said ledge portion being arranged to at least partially support said spring other end and thereby maintain the same in a given orientation relative to said ramp portion; and
      (c) a flexible resilient inner cable member extending through said guide spring and terminating at one end in an enlarged cable extremity adjacent said ramp means, whereby upon progressive axial displacement of the cable toward the ramp means, the cable is guided to cause the enlarged cable extremity to ride up the ramp means into locking engagement with said cable-mounting opening.

2. Apparatus as defined in claim 1, wherein said first tab means is bifurcated to define a pair of parallel spaced first tab portions (314a), the gap (342) between said first tab portions defining said second opening.

3. Apparatus as defined in claim 2, wherein the adjacent edges of said first tab portions contain recesses (314e) which cooperate to define a generally circular opening the diameter of which corresponds generally with the outer diameter of said guide spring.

4. Apparatus as defined in claim 1, wherein said ramp portion is bifurcated along a line opposite said circular opening and generally normal to said firs fold line, whereby the gap (340) defined by the bifurcation defines the cable-mounting opening.

5. A parking brake lever adapter for use in a blind cable parking brake assembly, comprising: a parking brake lever formed by stamping from rolled metal stock, said lever being adapted for pivotal connection at one end with a backing plate and including at its other end:
   (a) inclined generally planar ramp means (314b) adjacent one side edge of said lever, said ramp means containing a cable-mounting opening (340);
   (b) guide spring support means adjacent the other side edge of said lever opposite and spaced from said ramp means; and
   (c) a generally planar intermediate portion (314c) arranged between said ramp means and said guide spring support means, said ramp means comprising an integral ramp portion bent from said lever about a first fold line (314g) to define an obtuse angle relative to said intermediate portion;
   (d) said guide spring support means including:
      (1) generally planar first tab means (314a) bent about a second fold line (314h) generally parallel with said first fold line to a position generally normal to said intermediate portion and extending on the same side thereof as said ramp portion, said first tab means containing a second opening (342) for receiving the other end of said guide spring; and
      (2) a ledge portion (314d) generally coplanar with, and arranged on the opposite side of said first tab means from, said intermediate portion, said ledge portion being arranged to at least partially support said spring other end and thereby maintain the same in a given orientation relative to said ramp portion.

6. A parking brake lever as defined in claim 5, wherein said tab means comprises a pair of spaced tabs (314a), the spacing distance between said tabs being generally equal to the thickness of said ledge portion.

* * * * *

UNITED STATES PATENT AND TRADEMARK OFFICE
CERTIFICATE OF CORRECTION

PATENT NO. : 5,137,120
DATED : August 11, 1992
INVENTOR(S) : BARBOSA, Manuel

It is certified that error appears in the above-indentified patent and that said Letters Patent is hereby corrected as shown below:

On the title page, correct the name of the assignee to read:
-- Orscheln Co. --

Signed and Sealed this

Twelfth Day of October, 1993

Attest:

BRUCE LEHMAN

Attesting Officer     *Commissioner of Patents and Trademarks*